Dec. 7, 1937.   F. O. HOAGLAND   2,101,177
BENCH TYPE MACHINE TOOL
Filed Sept. 10, 1936   2 Sheets-Sheet 1
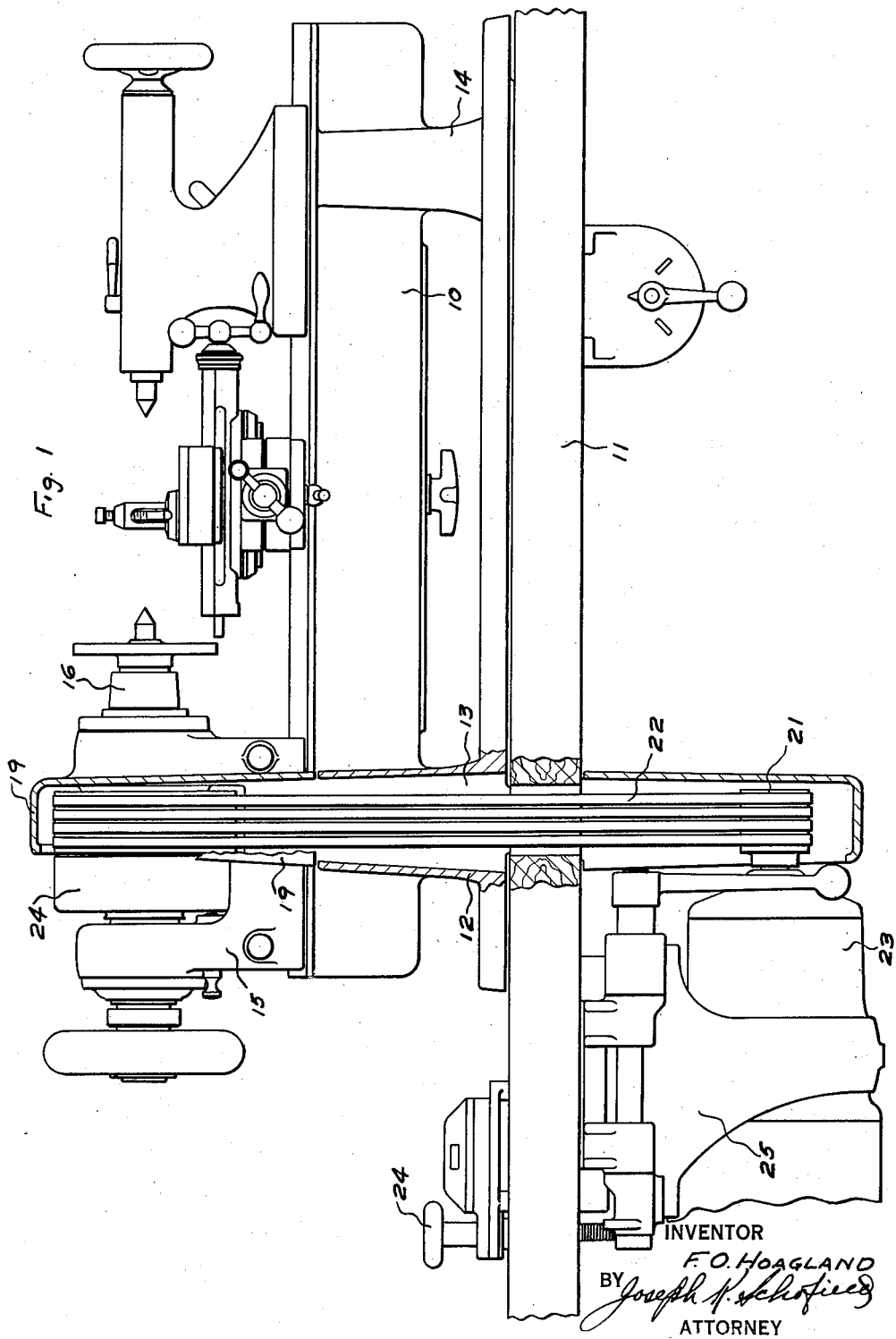

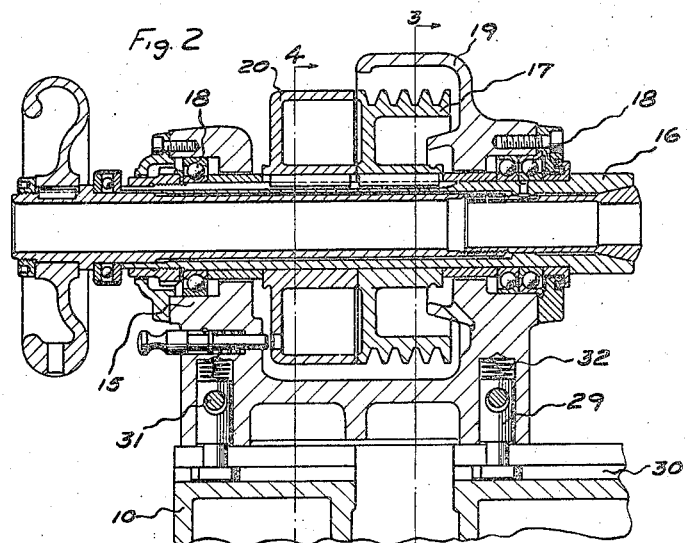
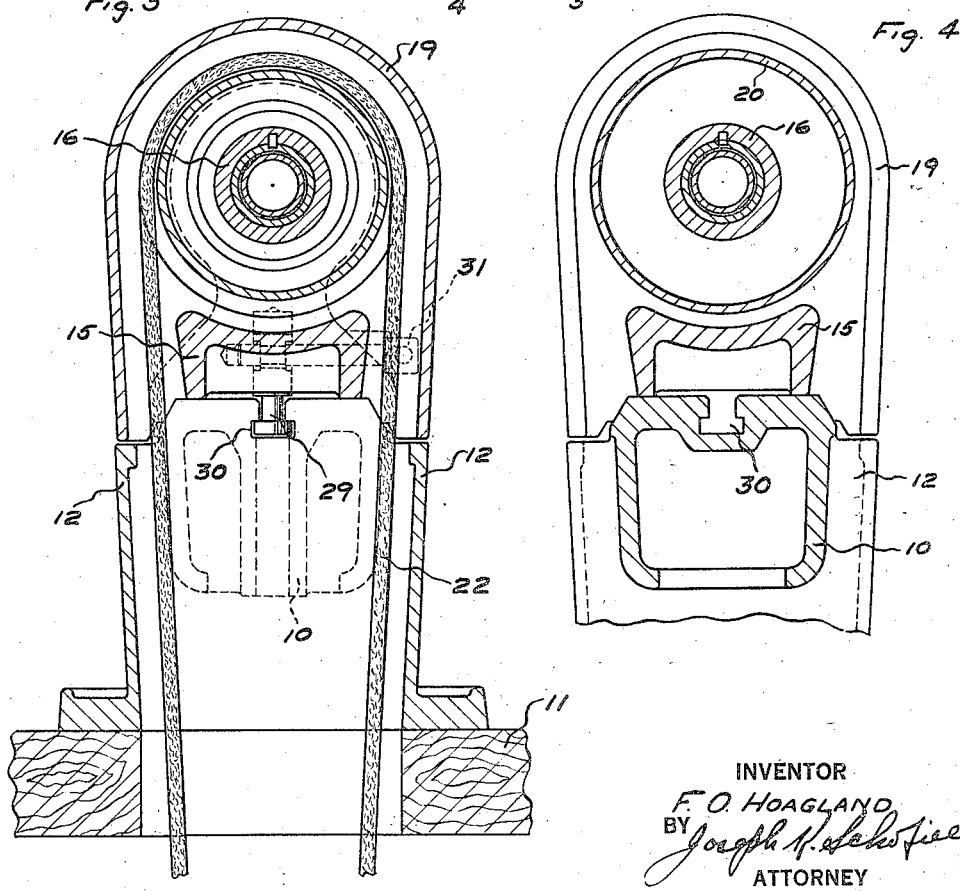

Patented Dec. 7, 1937

2,101,177

UNITED STATES PATENT OFFICE 2,101,177

BENCH TYPE MACHINE TOOL

Frank O. Hoagland, West Hartford, Conn., assignor to Niles-Bement-Pond Company, Hartford, Conn., a corporation of New Jersey Application September 10, 1936, Serial No. 100,143

7 Claims. (Cl. 82—6)

This invention relates to bench lathes, small milling machines and other machine tools, particularly to a headstock construction therefor and to a spindle mounting and driving means forming part of the base and headstock of the machine.

A primary object of the invention is to provide a bench type machine tool with an improved multi-speed driving means for its spindle enabling the driving belt or belts therefor to be changed readily by detaching the headstock from the base and by passing the belt or belts through a central opening through the base of the machine to a variable speed driving pulley conveniently mounted below the base.

Another object of importance is that the driving belts for the headstock spindle may be completely enclosed by integral portions respectively of the headstock and the base but are accessible upon removal of the headstock.

Another feature that is advantageous and forms a part of this invention is that a member on the spindle adjacent the driving belt pulley and lying beyond the enclosure for the driving belts is provided by means of which rotation of the spindle may be manually stopped or started by the operator without fear of coming into contact with the pulley or with the driving belts.

With the above and other objects in view my invention consists in the features of construction and operation set forth in the following specification and illustrated in the accompanying drawings.

In the accompanying drawings annexed hereto and forming a part of this specification, I have shown my invention embodied in a bench type tool makers' lathe but it will be understood that some of the features of the invention can be otherwise embodied and that the drawings are not to be construed as defining or limiting the scope of the invention, the claims appended to this specification being relied upon for that purpose.

In the drawings:

Figure 1 is a front elevation of a complete bench lathe provided with the present invention, a part being broken away to more clearly disclose the construction.

Fig. 2 is a central longitudinal section through the headstock and a portion of the base of the lathe shown in Fig. 1, the spindle having another form of engaging means for the work or tool being rotated.

Fig. 3 is a cross sectional view taken on the plane of line 3—3 of Fig. 2, and

Fig. 4 is a cross sectional view taken on the plane of line 4—4 of Fig. 2.

In the above-mentioned drawings I have shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a bed or base having a central opening therethrough, this opening being above a hollow pedestal integral with the bed or base and the opening in the bed being continuous with the opening within the pedestal; second, a headstock detachably secured to the base; third, a spindle therein having a driving pulley thereon; fourth, an enclosure for the pulley formed integrally with the headstock and extending to the lowermost surface of the headstock; and fifth, one or more belts extending over the pulley on the spindle and housed within the enclosure.

Referring more in detail to the figures of the drawings, I provide a base 10 adapted to be secured rigidly in position upon a suitable table or other support 11. Extending completely through a pedestal 12 for supporting the headstock end of the base upon the table 11 is an opening 13 of sufficient width transversely to permit driving belts 14 to pass therethrough. The pedestal 12 is laterally enlarged compared to the width of the base as shown most clearly in Figs. 3 and 4 and has its sides carried up to the upper surface of the base 10 at points spaced from the front and rear walls of the base 10. By this means an enclosed space or opening 13 is provided extending vertically through the base from the upper surface thereof directly to the surface upon which the base is mounted upon its support. There may also be provided a second pedestal 14 for the base below and supporting the tailstock end of the machine, this pedestal being of conventional or any preferred form.

Mounted upon the upper surface of one end of the base 10 is the headstock 15 having a work supporting and rotating spindle 16 therein and having a driving pulley 17 directly secured thereto at a point intermediate its length and between anti-friction supporting bearings 18 therefor. Adjacent this pulley 17 there may be provided a member 20 having a cylindrical surface to be used as a braking means by the operator, this member being preferably separate from the pulley 17 but keyed to the spindle 16 at one side of the pulley. Extending over the pulley 17 to completely enclose and house the pulley 17 and extending downward to abut against the upper surfaces of the hollow pedestal 12 is an enclosing member or portion 19 formed integrally with the headstock 15.

Mounted directly below the headstock and the table 11 is a suitable driving pulley 21 for the belts 22. Preferably a motor unit 23 has the pulley 21 mounted adjacent one end of its armature shaft and to this pulley the pulley 17 on the spindle 16 is belted. Preferably and as shown, pulleys 21 and 17 are connected by means of the multiple driving connections or belts 22 shown in Figs. 1 and 3. The motor driven pulley 21 may be rotated at widely different speeds by any suitable variable speed mechanism comprising a portion of the motor unit 23. This mechanism forms no part of the present invention and therefore does not require description. In the form shown in Fig. 1 the speed of the motor 23 and pulley 21 may be controlled by hand wheel 24.

In order to replace belts 22 which may have become damaged or worn, it is only necessary to detach the headstock 15 from the base 10 by releasing the attaching means therefor and remove the headstock 15 a short distance from the base 10. A new belt 22 may then be inserted directly within the opening 13 through the pedestal 12 and passed below and around the driving pulley 21 below the table 11. The upper portion of the belt 22 can then be passed over the headstock 15 upon the pulley 17 and the headstock again clamped in operative position. To facilitate this replacing of belts 22 the motor unit 23 may be supported upon a swinging frame 25 which enables the driving pulley 21 to be raised sufficiently to materially loosen the belts 22. During operation the weight of the motor 23 is sufficient to provide driving tension for the belts.

In order to secure the headstock 15 rigidly to the base 10 in a manner to facilitate its removal and replacement in proper position quickly and conveniently there are provided two clamping bolts or members 29 having portions extending within a T-slot 30 centrally provided within the upper surface of the base 10. The clamping members 29 near their upper ends are provided with transverse openings engaged by the eccentric surface of transversely extending members 31 so that by rotating these members 31 the clamping members 29 can be drawn up tight to secure the headstock 15 firmly against the upper surface of the base 10. In order to release the clamping members 29 springs 32 may be inserted between the upper ends of these clamping members and the surfaces of the headstock so that upon rotating members 31 in the opposite direction the clamping members 29 will be released.

What I claim is:

1. In a bench type machine tool the combination of a bed having a transverse opening therethrough, a headstock on said bed having a supporting and rotating spindle therein, a pulley fixed on said spindle, and a driving belt passing over said pulley and extending within said headstock and through said opening in said bed.

2. In a bench type machine tool the combination of a bed having a transverse opening therethrough, a headstock secured to said bed on opposite sides of said opening, a supporting and rotating spindle in said headstock having a pulley thereon, and a driving belt passing over said pulley and extending within said headstock and through said opening in said bed.

3. In a bench type machine tool the combination of a bed having a transverse opening therethrough, a hollow pedestal for supporting said bed contiguous with said opening through said bed, a headstock on said bed having a supporting and rotating spindle therein, a driving pulley on said spindle, and a driving belt passing over said pulley and extending through said opening within the bed and through the pedestal.

4. In a bench type machine tool the combination of a bed having a transverse opening therethrough, a hollow pedestal for supporting said bed contiguous with said opening through said bed, a headstock secured to said bed on opposite sides of said opening, a supporting and rotating spindle in said headstock, a driving pulley on said spindle, and a driving belt passing over said pulley and extending through said opening within the bed and through the pedestal.

5. In a bench type machine tool the combination of a bed having a transverse opening therethrough, a hollow pedestal for supporting said bed formed integrally therewith and providing a contiguous opening through the bed and pedestal, a headstock attached to said bed on opposite sides of said opening, a spindle in said headstock having a driving pulley thereon, and a driving belt for said spindle passing over said pulley and passing through the opening through the bed and pedestal.

6. In a bench type machine tool the combination of a bed having a transverse opening therethrough, a headstock on said bed having a supporting and rotating spindle therein, a pulley fixed on said spindle, a driving belt passing over said pulley and extending within said headstock and through said opening in said bed, and a belt guard formed integrally on said headstock and enclosing said pulley.

7. In a bench type machine tool the combination of a bed having a transverse opening therethrough, a hollow pedestal for supporting said bed formed integrally therewith and providing a contiguous opening through the bed and pedestal, a headstock attached to said bed on opposite sides of said opening, a spindle in said headstock having a driving pulley thereon, a driving belt for said spindle passing over said pulley and passing through the opening through the bed and pedestal, and a belt guard formed integrally on said headstock and enclosing said pulley.

FRANK O. HOAGLAND.